United States Patent [19]
Boyd et al.

[11] Patent Number: 5,517,269
[45] Date of Patent: May 14, 1996

[54] METHOD OF ASSEMBLING ONE-TIME-USE CAMERA

[75] Inventors: James D. Boyd, Rochester; David Barclay, Bergen, both of N.Y.

[73] Assignee: Eastman Kodak Company, Rochester, N.Y.

[21] Appl. No.: 403,157

[22] Filed: Mar. 10, 1995

[51] Int. Cl.⁶ .................................................. G03B 17/26
[52] U.S. Cl. .................................................... 354/288
[58] Field of Search .......................................... 354/288

[56] References Cited

U.S. PATENT DOCUMENTS

| | | | |
|---|---|---|---|
| 2,753,777 | 7/1956 | Faulhaber et al. | 95/31 |
| 4,290,676 | 9/1981 | Hozman et al. | 354/121 |
| 5,349,410 | 9/1994 | Kamata . | |

Primary Examiner—Monroe H. Hayes
Attorney, Agent, or Firm—Roger A. Fields

[57] ABSTRACT

A method of assembling a one-time-use camera comprising the steps of placing one of a longitudinal series of edge perforations in a film leader of a filmstrip to be exposed in the camera onto one of an annular series of peripheral teeth of a metering sprocket rotatably supported on a main body part of the camera, and fitting a rear cover part of the camera to the main body part to make the camera light-tight, is characterized in that the rear cover part is fitted initially to the main body part with some separation between the two, and with a center portion of the rear cover part bowed in close proximity to the one tooth to prevent the metering sprocket from substantially rotating, and the rear cover part is fitted finally to the main body part with no separation between the two to make the main body part light-tight, and with the center portion of the rear cover part retracted from the one tooth to permit the metering sprocket to rotate.

9 Claims, 3 Drawing Sheets

5,517,269

METHOD OF ASSEMBLING ONE-TIME-USE CAMERA

CROSS-REFERENCE TO RELATED APPLICATIONS

Reference is made to commonly assigned copending applications Ser. No. 08/327250, entitled COVER ASSEMBLY FOR CAMERA and filed Oct. 21, 1994 in the name of James D. Boyd, and Ser. No. 08/403,088 entitled METHOD OF ASSEMBLING ONE-TIME-USE CAMERA and filed Mar. 10, 1995 in the name of James D. Boyd.

The cross-referenced applications are incorporated in this application.

FIELD OF THE INVENTION

The invention relates generally to the field of photography, and in particular to a method of assembling a one-time-use camera.

BACKGROUND OF THE INVENTION

Film and cameras that are all in one, commonly referred to as single-use or one-time-use cameras, have recently become well known. Typically, the one-time-use camera is a simple point-and-shoot type comprising a plastic, inner, main body part which supports a fixed-focus taking lens, a film metering mechanism including a rotatably supported metering sprocket, a manual film advance thumbwheel, a single-blade shutter, a manual shutter release button, a frame counter for indicating the number of exposures remaining for picture-taking, a direct see-through viewfinder, and possibly an electronic flash unit. Plastic front and rear cover parts often house the main body part between them to complete the camera assembly, and the rear cover part connects to the main body part and/or to the front cover part to make the main body part light-tight. A decorative cardboard outer box contains the camera assembly and has respective openings for the taking lens, the shutter release button, the film advance thumbwheel, the viewfinder, the frame counter, and a flash emission window.

At the manufacturer, the main body part is loaded with a 12, 24, or 36 exposure 35 mm film cartridge, and the front and rear cover parts are connected to the main body part and/or to one another to complete the camera assembly and to make the main body part light-tight. Then, as disclosed in prior art U.S. Pat. No. 4,972,649, issued Nov. 27, 1990, an exposed end of a film take-up spool in the main body part is rotated to factory prewind substantially the entire length of the unexposed filmstrip from the cartridge shell onto the take-up spool. Lastly, the outer box is placed on the camera assembly.

After the photographer takes a picture with the one-time-use camera, he or she manually rotates the thumbwheel to rotate a cartridge spool inside the cartridge shell to rewind the exposed frame into the cartridge shell. The rewinding movement of the filmstrip the equivalent of slightly more than one frame width rotates the metering sprocket, which is in engagement with the filmstrip, to decrement the frame counter to its next lower-numbered setting. When the maximum number of exposures available on the filmstrip are exposed and the filmstrip is completely rewound into the cartridge shell, the one-time-use camera is given to a photofinisher who tears the outer box off the camera unit, separates the rear cover part from the main body part, and removes the film cartridge with the filmstrip from the main body part. Then, he removes the filmstrip from the cartridge shell to develop the negatives and make prints for the customer, and he forwards the used camera parts to the manufacturer for recycling, i.e. remanufacture.

Typically, during original manufacture or recycling of the one-time-use camera, the film cartridge including a film leader protruding from the cartridge shell and the film take-up spool to which a leading end of the protruding film leader is attached are placed in respective chambers in the main body part. The protruding film leader is positioned over the metering sprocket to place one of a longitudinal series of edge perforations in the leader onto one of an annular series of peripheral teeth on the metering sprocket in order to engage the leader to the metering sprocket. Then, the rear cover part is fitted to the main body part to prevent the protruding film leader from becoming separated from the metering sprocket. Because of the inherent curl of the protruding film leader, the leader may tend to spring away from the metering sprocket before the rear cover part is fitted to the main body part. If the rear cover is fitted to the main body part with the protruding film leader separated from the metering sprocket, the one-time-use camera cannot be operated to take pictures.

The Cross-referenced Applications

The two cross-referenced applications each disclose a method of assembling a one-time-use camera comprising the steps of placing one of a longitudinal series of edge perforations in a film leader of a filmstrip to be exposed in the camera onto one of an annular series of peripheral teeth of a metering sprocket rotatably supported on a main body part of the camera, and fitting a rear cover part of the camera to the main body part to make the camera light-tight. First, the rear cover part is fitted initially to the main body part with some separation between the two to allow access to inside the camera at successive assembly stations, and with a center portion of the rear cover part flexed toward the one tooth to prevent the one perforation from slipping off the one tooth during movement of the camera to the assembly stations. Then, the rear cover part is fitted finally to the main body part with no separation between the two to make the main body part light-tight, and with the center portion of the rear cover part straightened to retract from the one tooth. Although the film leader is secured to the metering sprocket, the metering sprocket may not be held in place.

SUMMARY OF THE INVENTION

According to one aspect of the invention a method of assembling a one-time-use camera comprising the steps of placing one of a longitudinal series of edge perforations in a film leader of a filmstrip to be exposed in the camera onto one of an annular series of peripheral teeth of a metering sprocket rotatably supported on a main body part of the camera, and fitting a rear cover part of the camera to the main body part to make the camera light-tight, is characterized in that:

the rear cover part is fitted initially to the main body part with some separation between the two, and with a center portion of the rear cover part bowed in close proximity to the one tooth to prevent the metering sprocket from substantially rotating; and the rear cover part is fitted finally to the main body part with no separation between the two to make the main body part light-tight, and with the center portion of the rear cover part retracted from the one tooth to permit the metering sprocket to rotate.

According to another aspect of the invention a one-time-use camera comprising a main body part, a metering sprocket rotatably supported on the main body part and having an annular series of peripheral teeth one of which is to be received in an edge perforation of a filmstrip to be exposed in the camera, and a rear cover part to be fitted to the main body part to make the camera light-tight, is characterized in that:

the main body part and the rear cover part have first-stage means for fitting the rear cover part initially to the main body part with some separation between the two, and with a center portion of the rear cover part bowed in close proximity to the one tooth to prevent the metering sprocket from substantially rotating; and the main body part and the rear cover part have second-stage means for fitting the rear cover part finally to the main body part with no separation between the two to make the main body part light-tight, and with the center portion of the rear cover part retracted from the one tooth to permit the metering sprocket to rotate.

DETAILED DESCRIPTION OF THE INVENTION

The invention is disclosed as being embodied preferably in a one-time-use camera. Because the features of a one-time-use camera are generally known as shown for example in prior art U.S. Pat. No. 4,972,649, issued Nov. 27, 1990, the description which follows is directed in particular only to those elements forming part of or cooperating directly with the disclosed embodiment. It is to be understood, however, that other elements may take various forms known to a person of ordinary skill in the art.

Figure 1:
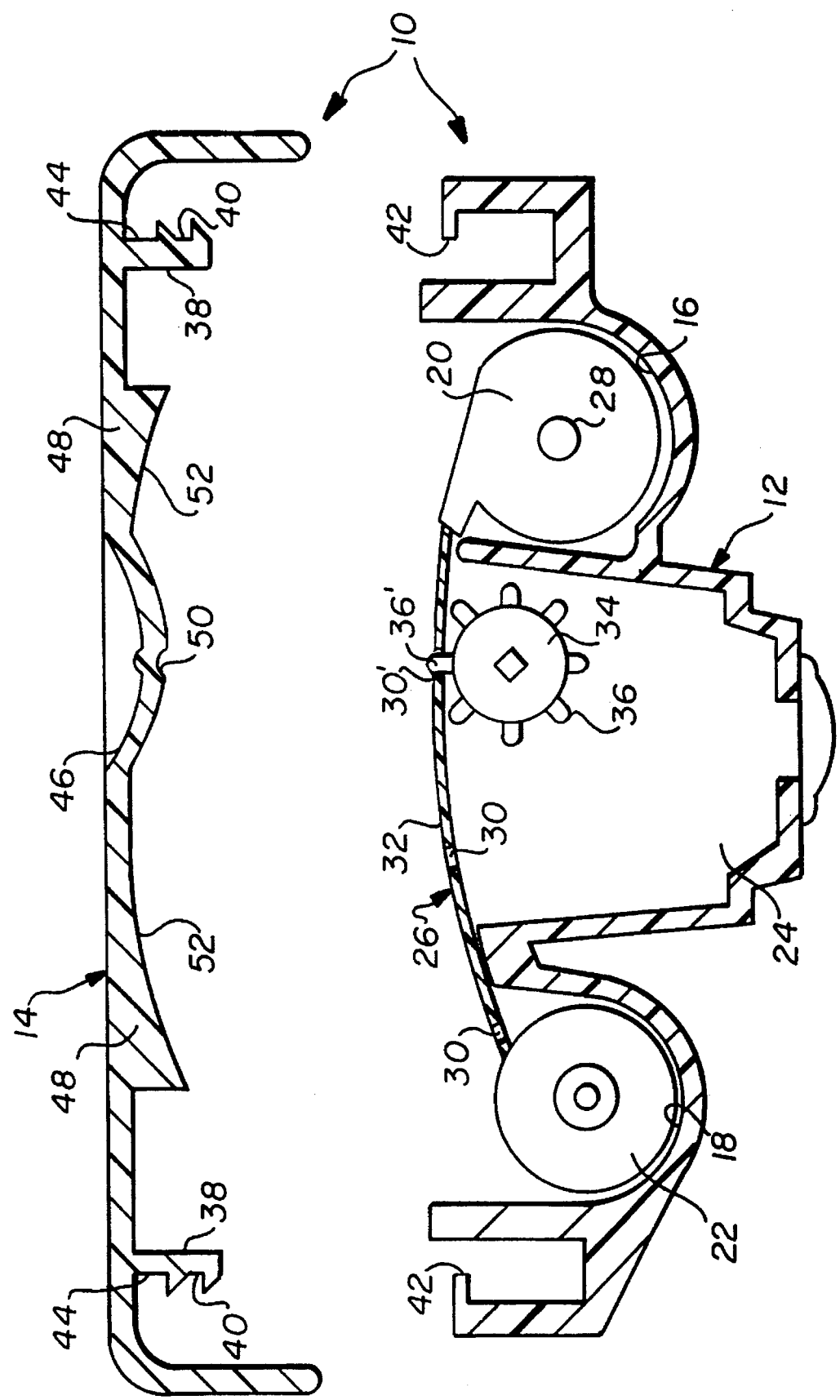
FIG. 1, 2, and 3 are sectional views of a one-time-use camera, showing successive steps of assembling the camera according to a preferred embodiment of the invention.
Figure 2:
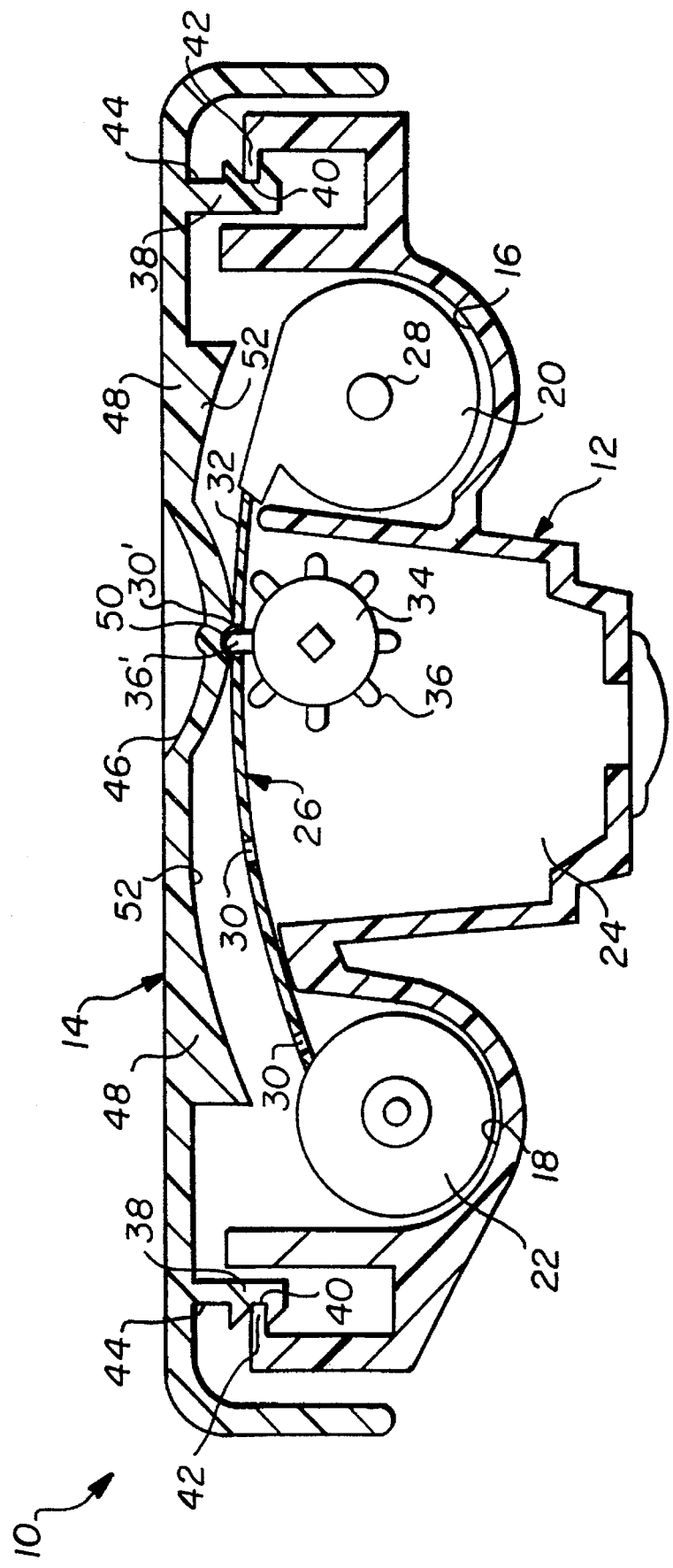
Figure 3:
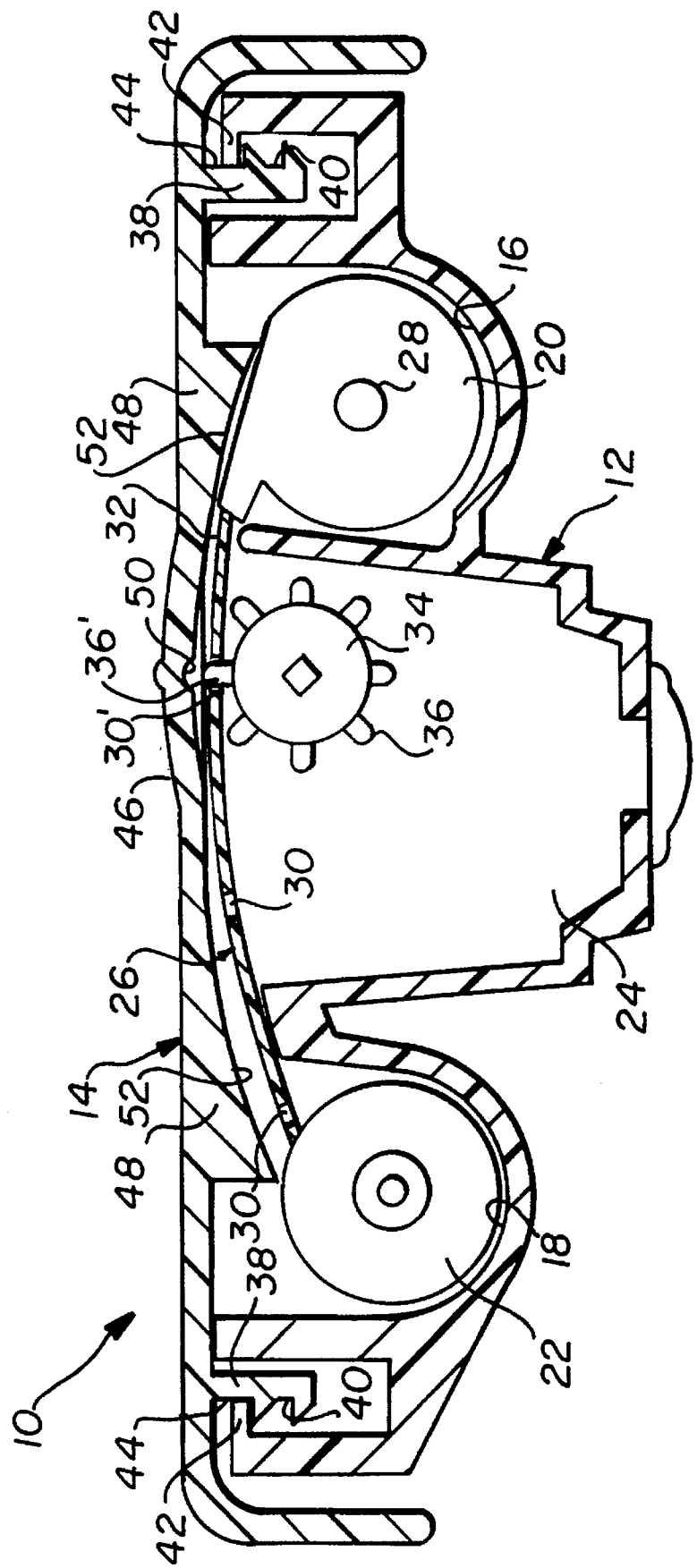

Referring now to the drawings, FIGS. 1–3 show a one-time-use camera 10 comprising a main body part 12 and a rear cover part 14 that are intended to be fit together to make the camera light-tight.

The main body part comprises integral cartridge-receiving and film roll chambers 16 and 18 for a light-tight film cartridge 20 and a rotatably supported film take-up spool 22. The chambers 16 and 18 are located at opposite sides of a backframe or exposure opening 24 at which successive frames of a filmstrip 26 are exposed during picture-taking. The filmstrip 26 is normally stored in a roll form on a cartridge spool 28 rotatably supported inside the film cartridge 20, and has a longitudinal series of edge perforations 30 including along a film leader 32 which protrudes from the film cartridge 20.

A rotatably supported metering sprocket 34 has an annular series of peripheral teeth 36 for successively engaging the respective perforations 30 in the filmstrip 26. Before the one-time-use camera 10 is assembled as shown in FIGS. 2 and 3, the film cartridge 20 with the protruding film leader 32 and the film take-up spool 22 to which a leading end of the leader is attached are placed in the cartridge-receiving and film roll chambers 16 and 18, and one of the edge perforations 30' in the protruding film leader 32 is placed onto one of the peripheral teeth 36' of the metering sprocket 34. See FIG. 1.

The rear cover part 14 has a pair of integral flexible fingers 38 provided with respective first-stage notches 40 which first receive corresponding flexible detents 42 of the main body part 12 to secure the rear cover part to the main body part with some separation between the two in an intermediate assembly position, shown in FIG. 2, and is provided with respective second-stage notches 44 which can then receive the detents to secure the rear cover part to the main body part with no separation between the two in a final assembly position, shown in FIG. 3. When the rear cover part 14 is in its intermediate assembly position, access is allowed to inside the camera at various assembly stations. When the rear cover part 14 is in its final assembly position, the rear cover part is fitted to the main body part 12 to make the main body part light-tight.

The rear cover part 14 has a center portion 46 that is substantially more flexible than the remainder 48 of the rear cover part to allow the center portion only to be snapped back and forth between an original convex configuration, shown in FIG. 2, arched from the remainder of the rear body portion to the one tooth 36' of the metering sprocket 34 and an opposite convex configuration, shown in FIG. 3, arched from the remainder of the rear cover part away from the one tooth. When the center portion 46 is in its original convex configuration, shown in FIG. 2, a cavity 50 in the center portion receives the one tooth 36' to prevent the one perforation 30' of the protruding film leader 32 from separating from the one tooth and to prevent the metering sprocket 34 from rotating. When the center portion 46 is in its opposite convex configuration, shown in FIG. 3, the cavity 50 is retracted from the one tooth 36' to permit the metering sprocket 34 to rotate. The center portion 46 and the one tooth 36' are relatively positioned to make the center portion be forced against the one tooth to snap the center portion automatically from its original concave configuration to its opposite concave configuration when the rear cover part 14 is shifted to its final assembly position.

The rear cover part 14 has a curved concave film support 52 which includes the center portion 46. As shown in FIGS. 1 and 2, the concave film support 52 is curved contrary to the arch of the center portion 46 when the center portion is in its original convex configuration.

The invention has been described with reference to a preferred embodiment. However, it will be appreciated that variations and modifications can be effected by a person of ordinary skill in the art without departing from the scope of the invention.

PARTS LIST 10 one-time-use camera
12 main body part
14 rear cover part
16 cartridge-receiving chamber
18 film roll chamber
20 film cartridge
22 film take-up spool
24 backframe opening
26 filmstrip
28 cartridge spool
30 edge perforations
30' one perforation 32 film leader
34 metering sprocket
36 peripheral teeth
36' one tooth
38 two fingers
40 two first-stage notches
42 two detents
44 two second-stage notches
46 center portion
48 remainder
50 cavity
52 curved film support

We claim:

1. A method of assembling a one-time-use camera comprising the steps of placing one of a longitudinal series of edge perforations in a film leader of a filmstrip to be exposed in the camera onto one of an annular series of peripheral teeth of a metering sprocket rotatably supported on a main body part of the camera, and fitting a rear cover part of the camera to the main body part to make the camera light-tight, is characterized in that:

the rear cover part is fitted initially to the main body part with some separation between the two, and with a center portion of the rear cover part bowed in close proximity to the one tooth to prevent the metering sprocket from substantially rotating; and the rear cover part is fitted finally to the main body part with no separation between the two to make the main body part light-tight, and with the center portion of the rear cover part retracted from the one tooth to permit the metering sprocket to rotate.

2. A method as recited in claim 1, wherein the center portion of the rear cover part is snapped from one convex configuration projecting from the remainder of the rear cover part toward the one tooth of the metering sprocket to an opposite convex configuration projecting from the remainder of the rear cover part away from the one tooth when the rear cover part is fitted finally to the main body part.

3. A method as recited in claim 2, wherein the center portion of the rear cover part is forced against the one tooth of the metering sprocket to be snapped from the one convex configuration to the opposite convex configuration when the rear cover part is fitted finally to the main body part.

4. A one-time-use camera comprising a main body part, a metering sprocket rotatably supported on said main body part and having an annular series of peripheral teeth one of which is to be received in an edge perforation of a filmstrip to be exposed in said camera, and a rear cover part to be fitted to said main body part to make said camera light-tight, is characterized in that:

said main body part and said rear cover part have first-stage means for fitting the rear cover part initially to the main body part with some separation between the two, and with a center portion of the rear cover part bowed in close proximity to said one tooth to prevent said metering sprocket from substantially rotating; and said main body part and said rear cover part have second-stage means for fitting the rear cover part finally to the main body part with no separation between the two to make the main body part light-tight, and with said center portion of the rear cover part retracted from said one tooth to permit said metering sprocket to rotate.

5. A one-time-use camera as recited in claim 4, wherein said center portion of the rear cover part is substantially more flexible than the remainder of said rear cover part to make the center portion be snapped from one convex configuration arched from the remainder of the rear cover part toward said one tooth of the metering sprocket to an opposite convex configuration arched from the remainder of the rear cover part away from the one tooth when said rear cover part is fitted finally to said main body part.

6. A one-time-use camera as recited in claim 5, wherein said center portion of the rear cover part and said one tooth of the metering sprocket are relatively positioned to make the center portion be forced against the one tooth to snap the center portion from the one concave configuration to the opposite convex configuration when the rear cover part is fitted finally to the main body part.

7. A one-time-use camera as recited in claim 5, wherein said rear cover part has a curved film support which includes said center portion of the rear cover part and is curved contrary to the arch of the center portion when the center portion is in its one convex configuration.

8. A one-time-use camera as recited in claim 4, wherein said center portion of the rear cover part has a cavity for receiving said one tooth of the metering sprocket to prevent said metering sprocket from substantially rotating.

9. A method of assembling a one-time-use camera comprising the steps of placing one of a longitudinal series of edge perforations in a film leader of a filmstrip to be exposed in the camera onto one of an annular series of peripheral teeth of a metering sprocket rotatably supported on a main body part of the camera, and fitting a rear cover part of the camera to the main body part to make the camera light-tight, is characterized in that:

the rear cover part is fitted initially to the main body part with some separation between the two, and with a center portion of the rear cover part arched in an original convex configuration projecting from the rear cover part toward the one tooth to hold the one perforation on the one tooth; and the rear cover part is fitted finally to the main body part with no separation between the two to make the main body part light-tight, and to force the center portion against the one tooth to snap the center portion to an opposite convex configuration projecting from the rear cover part away from the one tooth.

* * * * *